E. W. QUICK.
NUT LOCK.
APPLICATION FILED MAY 2, 1916.
1,203,405.
Patented Oct. 31, 1916.
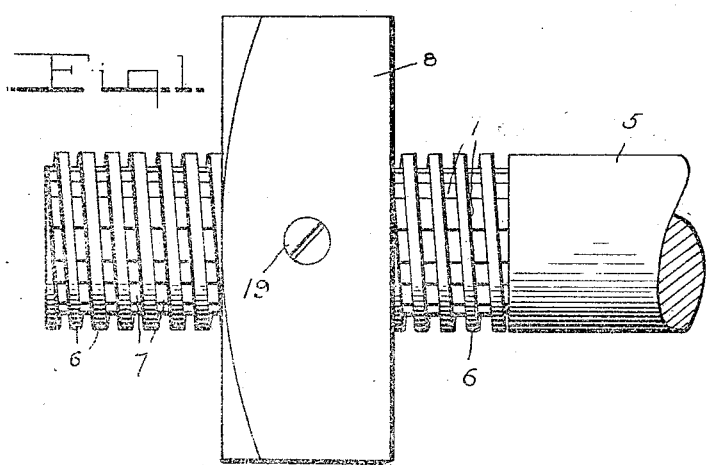
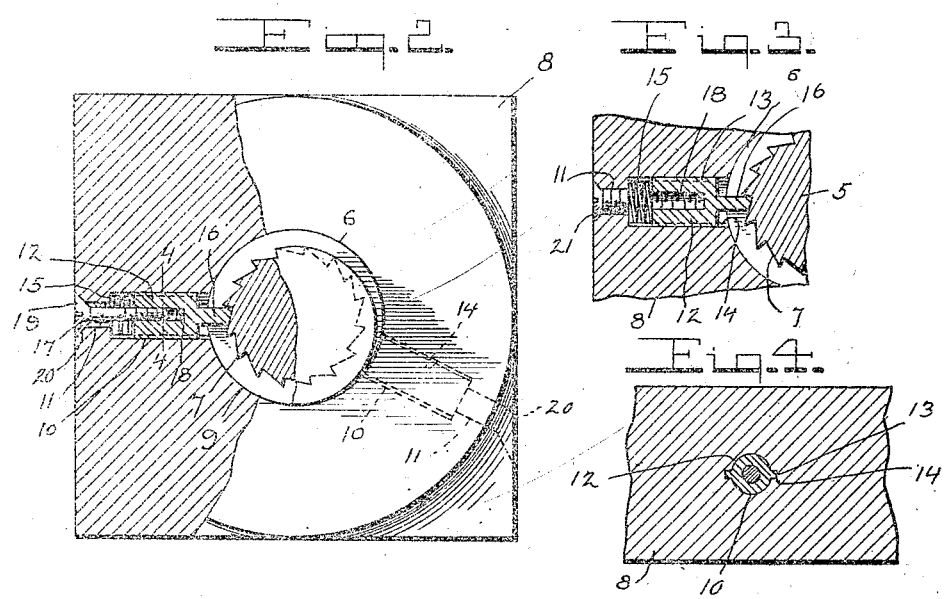
Inventor
E. W. Quick

UNITED STATES PATENT OFFICE.

ELONZY W. QUICK, OF CENTRALIA, FLORIDA.

NUT-LOCK.

1,203,405.  Specification of Letters Patent.  Patented Oct. 31, 1916.

Application filed May 2, 1916. Serial No. 94,901.

*To all whom it may concern:*

Be it known that I, ELONZY W. QUICK, a citizen of the United States, residing at Centralia, in the county of Hernando and State of Florida, have invented certain new and useful Improvements in Nut-Locks; and I do hereby declare the following to be a full, clear, and exact description of the invention, such as will enable others skilled in the art to which it appertains to make and use the same.

This invention has for its object to provide a novel and efficient nut lock of the type embodying a bolt having ratchet teeth formed in the groove defined by the external screw threads thereon and co-acting with spring actuated elements arranged in the nut to lock the latter against rotational movement upon the bolt.

Another object is the provision of simple and effective means for facilitating withdrawal of the spring actuated locking element from the teeth of the bolt to facilitate removal of the nut therefrom.

With these and other objects in view, the invention consists in the novel construction, combination and arrangement of parts as will be hereinafter specifically described, claimed and illustrated in the accompanying drawing, in which:

Figure 1 represents a plan view of the nut and bolt, the latter being partly broken away, Fig. 2 represents an end elevation thereof, partly in section, Fig. 3 represents a fragmentary sectional view, illustrating the closure screw in operative position, and Fig. 4 represents a detail sectional view on the line 4—4 of Fig. 2.

Referring to the drawing in detail, wherein similar reference numerals designate corresponding parts throughout the several views, the numeral 5 indicates the shank of a bolt of the usual or any preferred construction having the usual external screw threads 6, defining a spiral groove in which are formed a plurality of correspondingly arranged ratchet teeth 7. A nut 8 of the preferred type is threaded upon the terminal of the nut 5 and the bore 9 thereof comunicates with two or more radial openings 10, having their outer terminals 11 reduced in diameter and formed with internal screw-threads. Spring actuated locking members 12 are slidably mounted in the openings 10, and are formed in longitudinal ribs 13 slidably mounted in grooves 14 formed in the openings 10 to prevent rotation of the locking elements in the openings.

Each locking element 12 is normally retained in inwardly extended position by the tension of a spring 15 which is confined between the shoulder provided at the point of intersection of the relatively large and small ends of the opening 10 and the inner terminal of the locking element is reduced, as indicated at 16, for engagement with the ratchet teeth 7.

A screw 17, having a relatively long screw threaded shank, is adapted to fit in the threaded recess 18 formed in each locking element and is provided in its outer terminal with a head 19 adapted to fit in the outer terminal of the opening 10, so that the outer face of the head will lie flush with the adjacent face of the nut 8.

A relatively short screw 21 is adapted to fit the internally screw threaded and reduced outer terminal 11 of the opening in the nut to close said opening and prevent the entrance of dust and moisture therethrough.

In applying the nut lock to use, the locking element 12 is drawn outwardly so as to disengage the inner terminal 16 thereof from the teeth of the bolt 5 by inserting a screw 17 and turning it. After the nut has been advanced to the desired position upon the bolt the screw 17 is removed and the tension of the spring 15 automatically moves the locking element inwardly and engages the reduced inner terminal 16 thereof with the ratchet teeth 7 of the bolt, thereby rigidly locking the nut in adjusted position. Subsequent to the desired adjustment of the nut and the removal of the screw 17 the radial opening in the nut is closed by fitting the closure screw 21 in the reduced outer terminal 11 of the opening.

What I claim is:

A nut lock comprising a bolt having external screw threads and ratchet teeth formed in the groove defined by said screw threads, a nut fitted upon said bolt having an opening intersecting the bore thereof and having the outer terminal of said opening reduced and internally screw threaded, and a locking element slidably and non-rotatably mounted in said opening having a reduced inner terminal adapted to engage the ratchet teeth of said bolt to lock the nut against rotation thereon and having an internally screw threaded recess in the outer terminal thereof.

In testimony whereof I affix my signature in presence of two witnesses.

ELONZY ×<sup>his</sup><sub>mark</sub> W. QUICK.

Witnesses:
 URIAH B. GAYNOR,
 R. H. WEAM.